United States Patent
Dror et al.

(10) Patent No.: US 12,309,250 B1
(45) Date of Patent: May 20, 2025

(54) APPARATUS AND METHOD FOR PREVENTING LATENCY VARIATION IN TIMESTAMPS OF TIMING PROTOCOL PACKET TRANSMITTED THROUGH MULTI-LANE PORTS

(71) Applicant: Marvell Israel (M.I.S.L) Ltd., Yokne'am (IL)

(72) Inventors: Nitzan Dror, Ramot Hashavim (IL); Yaron Kittner, Pardes Hanna-Karkur (IL)

(73) Assignee: Marvell Israel (M.I.S.L) Ltd., Yokne'am (IL)

( * ) Notice: Subject to any disclaimer, the term of this patent is extended or adjusted under 35 U.S.C. 154(b) by 278 days.

(21) Appl. No.: 18/049,912

(22) Filed: Oct. 26, 2022

Related U.S. Application Data

(60) Provisional application No. 63/272,140, filed on Oct. 26, 2021.

(51) Int. Cl.
*H04L 69/28* (2022.01)
*H04J 3/06* (2006.01)

(52) U.S. Cl.
CPC ............ *H04L 69/28* (2013.01); *H04J 3/0667* (2013.01)

(58) Field of Classification Search
CPC ................................. H04L 69/28; H04J 3/0667
See application file for complete search history.

(56) References Cited

U.S. PATENT DOCUMENTS

| | | | | |
|---|---|---|---|---|
| 8,718,482 | B1* | 5/2014 | Roberts | H04B 10/27 398/53 |
| 8,873,589 | B2* | 10/2014 | Aweya | H04J 3/0667 370/503 |
| 9,167,058 | B2* | 10/2015 | Gresham | H04L 47/30 |
| 9,178,637 | B2* | 11/2015 | Aweya | H04J 3/0667 |
| 10,104,148 | B2* | 10/2018 | Yang | H04L 1/0018 |
| 11,063,738 | B1* | 7/2021 | Wang | H04L 7/0008 |
| 11,509,411 | B2* | 11/2022 | Vincent | G06F 1/12 |
| 2012/0207178 | A1* | 8/2012 | Webb, III | H04L 47/365 370/429 |

\* cited by examiner

*Primary Examiner* — Bailor C Hsu

(57) ABSTRACT

A method for increasing accuracy of a timing protocol packet includes receiving, at a buffer of a first node, for transmission onto a transmission medium, at least one timing protocol packet among a plurality of packets, detecting that a delay-inducing phenomenon affecting a timestamp to be applied to a timing protocol packet will occur within a temporal interval, and in response to detecting that the delay-inducing phenomenon will occur within the temporal interval, preventing, during the temporal interval, application of the timestamp to the timing protocol packet and preventing transmission of the timing protocol packet onto the transmission medium until the delay-inducing phenomenon has elapsed.

19 Claims, 5 Drawing Sheets

APPARATUS AND METHOD FOR PREVENTING LATENCY VARIATION IN TIMESTAMPS OF TIMING PROTOCOL PACKET TRANSMITTED THROUGH MULTI-LANE PORTS

CROSS REFERENCE TO RELATED APPLICATION

This disclosure claims the benefit of commonly-assigned U.S. Provisional Patent Application No. 63/272,140, filed Oct. 26, 2021, which is hereby incorporated by reference herein in its entirety.

FIELD OF USE

This disclosure relates to preventing delay-inducing phenomena from affecting timing protocol packets transmitted through multi-lane ports of a network device (e.g., a network switch). More particularly, this disclosure relates to the methods and systems for pausing and resuming transmission of timing protocol packets in a manner that avoids delay-inducing phenomena, which may cause timestamps of the timing protocol packets to become inaccurate.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Apparatus (e.g., a network device such as a network switch, or an Ethernet physical layer transceiver) that is configured to transport data packets via multiple data lanes regularly transmits, on each lane, timing protocol packets originating elsewhere in the apparatus in accordance with established timing protocols. Timestamps are updated at the receipt and transmission of a timing protocol packet from any block of the apparatus. However, in order to minimize or eliminate skew among the data lanes, control data, such as alignment markers, may be inserted into a data stream so that the receiver can determine how much to adjust a deskew buffer for each lane. However, the insertion of an alignment marker may itself cause a delay in the transmission of a timing protocol packet, which may render the timestamp of that packet inaccurate, introducing clock skew downstream.

SUMMARY

In accordance with implementations of the subject matter of this disclosure, a method for increasing accuracy of a timing protocol packet includes receiving, at a buffer of a first node, for transmission onto a transmission medium, at least one timing protocol packet among a plurality of packets, detecting that a delay-inducing phenomenon affecting a timestamp to be applied to a timing protocol packet will occur within a temporal interval, and in response to detecting that the delay-inducing phenomenon will occur within the temporal interval, preventing, during the temporal interval, application of the timestamp to the timing protocol packet and preventing transmission of the timing protocol packet onto the transmission medium until the delay-inducing phenomenon has elapsed.

In a first implementation of such a method for increasing accuracy of a timestamp applied to a timing protocol packet, the delay-inducing phenomenon may be periodic and detecting that the delay-inducing phenomenon affecting a timestamp to be applied to a timing protocol packet will occur within the temporal interval may include detecting that a period of the periodic delay-inducing phenomenon will elapse during a duration of the temporal interval.

In a second implementation of such a method for increasing accuracy of a timestamp applied to a timing protocol packet, receiving the at least one timing protocol packet of the plurality of packets may include receiving at least one precision time protocol (PTP) packet among a plurality of PTP packets.

A third implementation of such a method for increasing accuracy of a timestamp applied to a timing protocol packet may further include storing in a memory the at least one timing protocol packet of which transmission was prevented until the delay-inducing phenomenon has elapsed.

According to a first aspect of that third implementation of such a method for increasing accuracy of a timestamp applied to a timing protocol packet, the method may further include determining that the delay-inducing phenomenon has occurred and in response to determining that the delay-inducing phenomenon has occurred, applying a timestamp to the at least one timing protocol packet, and resuming transmission of the at least one timing protocol packet onto the transmission medium.

In a first instance of that first aspect, the resuming may include transmitting the at least one timing protocol packet that was stored in memory to avoid the delay-inducing phenomenon.

A fourth implementation of such a method for increasing accuracy of a timestamp applied to a timing protocol packet may further include determining the temporal interval based on when an insertion of control data affecting a timestamp to be applied to a timing protocol packet is predicted to occur and determining a duration of the temporal interval based on a data rate.

According to a first aspect of that fourth implementation of such a method for increasing accuracy of a timestamp applied to a timing protocol packet, detecting that the delay-inducing phenomenon will occur within the temporal interval may include monitoring for the inserted control data, which causes latency variation in the transmission of the at least one timing protocol packets.

In a first instance of that first aspect, detecting that the delay-inducing phenomenon occurs within a temporal interval include detecting an inserted control data within a temporal interval on a data bus lane of a plurality of data bus lanes, wherein each data bus lane is configured to transport a portion of the at least one packet from among the plurality of packets.

In a first variant of that first instance, detecting that the delay-inducing phenomenon occurs within a temporal interval may include predicting when an insertion of an alignment marker into a data stream occurs, wherein the alignment marker is configured to align a data bus lane of the plurality of data bus lanes relative to other data bus lanes of the plurality of data bus lanes.

In accordance with implementations of the subject matter of this disclosure, apparatus for sending timing protocol packets from a first node onto a transmission medium included a buffer in the first node, the first node being configured to receive, at the buffer, for transmission onto the transmission medium, at least one timing protocol packet among a plurality of packets, memory and control circuitry configured to detect that a delay-inducing phenomenon affecting a timestamp to be applied to timing protocol packet will occur within a temporal interval and in response to detecting that the delay-inducing phenomenon will occur within the temporal interval, prevent, during the temporal interval, application of the timestamp to the timing protocol packet and preventing transmission of the timing protocol packet onto the transmission medium until the delay-inducing phenomenon has elapsed.

In a first implementation of such an apparatus, the control circuitry may be configured to detect that the delay-inducing phenomenon will occur within a temporal interval by detecting that a period of a periodic delay-inducing phenomenon will elapse within the temporal interval.

In a second implementation of such an apparatus, the first node may be configured to receive, at the buffer, at least one Precision Time Protocol (PTP) packet among a plurality of PTP packets.

In a third implementation of such an apparatus, the control circuitry may be further configured to store, in the memory, the at least one timing protocol packet of which transmission was prevented until the delay-inducing phenomenon has elapsed.

According to a first aspect of that third implementation, the memory in which the at least one timing protocol packet is to be stored may be the buffer.

In a first instance of that first aspect, the control circuitry may be further configured to determine that the delay-inducing phenomenon has occurred and in response to determining that the delay-inducing phenomenon has occurred, apply a timestamp to the at least one timing protocol, and resume transmission of the at least one timing protocol packet onto the transmission medium.

In a first variant of that first instance, the control circuitry may be configured to resume transmission by transmitting the at least one timing protocol packet that was stored in the buffer to avoid the delay-inducing phenomenon.

In a fourth implementation of such an apparatus for sending timing protocol packets from a first node onto a transmission medium, the control circuitry may be further configured to determine that the temporal interval based on when insertion of a control data affecting a timestamp to be applied to timing protocol packet is predicted to occur and determine a duration of the temporal interval based on a data rate.

A first aspect of that fourth implementation may further include a plurality of data bus lanes, each data bus lane configured to transport a portion of the at least one packet from among the plurality of packets.

In a first instance of that first aspect, the control circuitry may be configured to detect that the delay-inducing phenomenon will occur within the temporal interval by monitoring for the insertion of the control data.

In a first variant of that first instance, the control circuitry may be configured to monitor for the insertion of the control data by predicting when an insertion of an alignment marker into a data stream occurs, wherein the alignment marker is configured to align a data bus lane of the plurality of data bus lanes relative to other data bus lanes of the plurality of data bus lanes.

BRIEF DESCRIPTION OF THE DRAWINGS

Further features of the disclosure, its nature, and various advantages, will be apparent upon consideration of the following detailed description, taken in conjunction with the accompanying drawings, in which like reference characters refer to like parts throughout, and in which.

DETAILED DESCRIPTION

Figure 1:
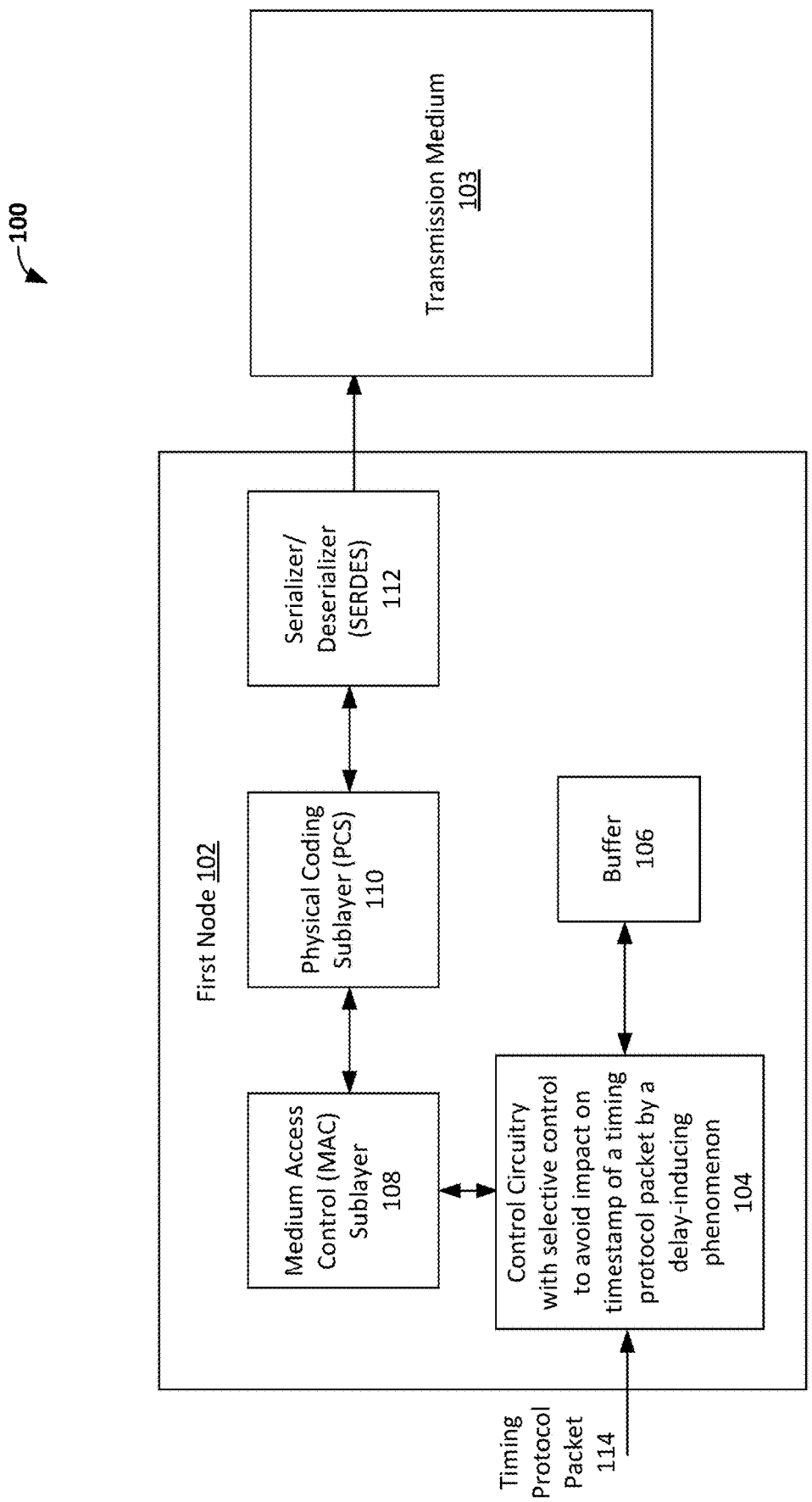
FIG. 1 is a block diagram of an apparatus including a first node, configured to transmit a timing protocol packet to a transmission medium, in accordance with implementations of the subject matter of this disclosure.

A data network may use timing protocol packets to maintain the correct time throughout the network. For example, Ethernet devices may operate under Precision Time Protocol (PTP), governed by the IEEE 1588 standard, according to which each device, or node, maintains its own time-of-day clock, but periodically corrects its time-of-day clock by querying a main node, which is known to have the correct time of day, and may also be referred to as a "grandmaster" node. A "local" (i.e., non-master) node may send a time query message to the main node, which may reply by returning a timestamp signal to the local node. Such queries, and replies thereto, are carried by timing protocol packets.

In order to minimize or eliminate skew among the data lanes in a multi-lane system in which packets may be spread across lanes, control data (e.g., alignment markers) may be inserted into a data stream so that the receiver can determine how much to adjust a deskew buffer for each lane. Specifically, the deskew buffers may be operated to delay or slow data traffic in different lanes by different amounts until the alignment markers in the different lanes become aligned with one another.

However, when an alignment marker is inserted, the packet traffic pauses, thereby delaying any packets that had been queued for transmission. Depending on at what point in time during packet transmission the alignment marker is inserted, the insertion of the alignment marker may cause a delay in transmission of a timing protocol packet to which a timestamp has already been applied. If transmission of a timing protocol packet to which a timestamp had already been applied is delayed, that transmission delay will render the timestamp inaccurate, and that inaccuracy may be difficult to account for, because it will exceed, by an unknown variable amount, the expected latency between timestamp application and packet egress from the system.

In accordance with implementations of the subject matter of the present disclosure, inaccuracies that may be introduced by insertion of an alignment marker may be mitigated by preventing timestamping and transmission of timing protocol packets when insertion of an alignment marker or other delay-inducing phenomenon is determined to be imminent. In such a case, the timestamping and transmission of the timing protocol packet is allowed to proceed only after insertion of the alignment marker is complete and insertion of another alignment marker is not imminent.

Application of alignment markers across lanes may occur relatively infrequently (e.g., on the order of seconds) as compared to the issuance of timing protocol packets, which may be issued on a regular schedule, or in response to a query from another node in the network, but in any case, on the order of nanoseconds. Moreover, the application of alignment markers and the issuance of timing protocol packets may be performed by different system components. For example, timing protocol packets may be issued by the medium access control (MAC) layer of an interface, while alignment markers may be applied by the physical coding sublayer (PCS) of the interface. Therefore, typically, the MAC sublayer may issue a timing protocol packet and apply a timestamp without being aware that an alignment marker is about to be inserted by the PCS.

In any case, whenever an alignment marker is inserted after a timestamp has been applied to a timing protocol packet but before the timing protocol packet has been transmitted (delays before the timestamp has been applied are not of concern), the delay in transmission (which in the case of an inserted alignment marker in a PTP system could be up to 13 ns) may cause a packet delay variation that may be difficult to account for because it increases the egress latency of the timestamped timing protocol packet by an indeterminate amount.

Therefore, in accordance with implementations of the subject matter of this disclosure, the component that issues timing protocol packets monitors the component that issues alignment markers (or other delay-inducing phenomena) and, if an occurrence of a delay-inducing phenomenon is going to occur within a predetermined temporal interval relative to issuance of timestamped timing protocol packet, application of the timestamp and issuance of the timing protocol packet are delayed until after the delay-inducing phenomenon has occurred, as described in more detail below.

The subject matter of this disclosure may be better understood by reference to FIGS. 1-4.

FIG. 1 is a depictive block diagram of a network apparatus 100 including a first node 102, configured to transmit a timing protocol packet 114 onto a transmission medium 103, in accordance with implementations of the subject matter of this disclosure. Apparatus 100 may be a part of a system network. Apparatus 100 includes a plurality of nodes, including a first node 102 and transmission medium 103, such as a cable or an optical fiber. A node (e.g., first node 102) may be a networking device such as a network switch or, more simply, an Ethernet physical layer transceiver which may be coupled to a functional device (not shown). The first node 102 includes control circuitry 104, buffer 106, medium access control (MAC) sublayer 108, physical coding sublayer (PCS) 110, and a serializer/deserializer (SERDES) 112. The control circuitry 104 has selective control to avoid delay inducing phenomena that impacts a timing protocol packet timestamp in accordance with implementations of the subject matter of this disclosure as described hereinafter. The first node 102 and transmission medium 103 are configured to receive and transmit timing protocol packets 114 (e.g., precision time protocol (PTP) packets)). Buffer 106 is configured to store timing protocol packets (e.g., timing protocol packet 114) received by the first node 102 until the occurrence of the delay-inducing phenomenon has elapsed. The control circuitry 104 may include a processing unit or any suitable processing unit, such as a processing core of a switch or other network device and, although shown as a separate unit, may be at least partially distributed within other components such as MAC sublayer 108 and/or PCS sublayer 110. Buffer 106 may be volatile memory or any other suitable memory for temporary storage. The buffer 106 is configured to store an address that points to the timing protocol packet 114 stored in another memory.

The first node 102 receives at least one timing protocol packet 114 among a plurality of packets from a source (e.g., another node of apparatus 100). In some implementations, the at least one timing protocol packet 114 is at least one precision time protocol (PTP) packet. The first node 102 may include a plurality of data bus lanes, on which the packets are transmitted. In order to minimize or eliminate skew among the data lanes, alignment markers may be inserted into a data stream so that the receiver can determine how much to adjust the deskew buffer of each lane, in which packets may be spread across the lanes. The deskew buffers may be operated to delay or slow data traffic in different lanes by different amounts until the alignment markers in the different lanes become aligned with one another. However, if an alignment marker is inserted into the data stream in a particular lane after a timestamp has been applied to the timing protocol packet but before the timing protocol packet has been transmitted, the delay in transmission resulting from insertion of the alignment marker may cause a packet delay variation or jitter of unpredictable magnitude. This jitter cannot be accounted for because the process of insertion of alignment markers is asynchronous to the process of timestamping and egressing a timing protocol packet, meaning that the insertion of an alignment marker can occur at unpredictably different times during the timestamping and egressing process. If the timing protocol packet is transmitted after the transmission delay, the timestamp will be stale and inaccurate (i.e. the timestamp will indicate an incorrect time) by an indeterminate amount.

Therefore, in implementations of the subject matter of this disclosure, if a delay-inducing phenomenon, such as insertion of an inserted alignment marker into a data stream, is going to occur within a temporal interval relative to issuance of timestamped timing protocol packet, the application of the timestamp and the transmission of the timing protocol packet are prevented until after the delay-inducing phenomenon has occurred. In this manner, when a timestamped timing protocol packet is to transmit, the timestamp will not have been impacted by a delay inducing event occurring after application of the timestamp such that the timestamp will accurately reflect the time that is stamped. The temporal interval may be limited to the specific period starting from when a detected insertion of an alignment marker begins and ending when the insertion of the alignment marker ends or may include temporal guard bands before and after that specific period.

In some implementations, control circuitry 104 is communicatively coupled to buffer 106, in order to store and access timing protocol packets (e.g., timing protocol packet 114) stored in the buffer 106 when the control circuitry 104 detects that a delay-inducing phenomenon is to occur within the temporal interval. A data bus interface may be used to transport timing protocol packets (e.g., timing protocol packet 114). The data bus between the buffer 106 and control circuitry 104 provides a network bus for the reading or writing of data to buffer 106. In some implementations, the processor core or processing unit of control circuitry 104 may include a hardware processor, a software processor (e.g., a processor emulated using a virtual machine), or any combination thereof. The processor core, also referred to herein as control circuitry 104, may include any suitable software, hardware, or both for controlling the data path of packets and the first node 102. The control circuitry 104 may control access to buffer 106, the medium access control (MAC) sublayer 108, the physical coding sublayer (PCS) 110, and the serializer/deserializer (SERDES) 112. The capabilities of the control circuitry 104 may also be referred to as capabilities of the first node 102.

The first node 102 is configured to prevent the application of a timestamp to the timing protocol packet 114 if the control circuitry 104 determines that an alignment marker is to occur within a temporal interval, which is the period of time during which a timing protocol packet would be affected by the inserted alignment marker. The first node 102 prevents, during the temporal interval, application of a timestamp of the timing protocol packet 114 by preventing the timing protocol packet 114 from reaching the timestamp application component, in an implementation. First node 102 may prevent the timing protocol packet 114 from reaching the timestamp application component by storing the timing protocol packet 114 in buffer 106. In some implementations, the timestamp application component is the MAC sublayer 108. By preventing timing protocol packets (including timing protocol packet 114) from being transmitted from the buffer 106, the first node 102 prevents the timestamping of any timing protocol packets. Once the control circuitry 104 determines that insertion of the alignment marker into the data stream is complete (including any temporal guard band following the insertion, as described above), the control circuitry 104 accesses stored timing protocol packets in the buffer 106 and controls the timestamp application component (e.g., the MAC sublayer 108), which applies a timestamp to each of the stored timing protocol packets. The first node 102 then resumes transmission of the stored timing protocol packets (e.g., including timing protocol packet 114). The control circuitry 104 removes the timing protocol packet 114 from the buffer 106 when resuming the transmission of the timing protocol packet 114.

The medium access control (MAC) sublayer 108 is implemented within a data link layer of the first node 102. In some implementations, the MAC sublayer 108 is configured to update the timestamp of timing protocol packets once the MAC sublayer 108 receives the timing protocol packet. The MAC sublayer 108 may monitor the PCS 110 in order to determine when to expect an occurrence of the delay-inducing phenomenon.

The physical coding sublayer (PCS) 110 is implemented within a physical layer of the first node 102. In some implementations, the PCS 110 is responsible for encoding/decoding, alignment marker insertion and PCS lane synchronization. In some implementations, the PCS 110 contains a plurality PCS lanes, which correspond to a plurality of SERDES data lanes. In such a multi-lane system, alignment markers may be inserted at the PCS 110 so that the receiver can determine how much to adjust the deskew buffer of each lane. Specifically, the deskew buffers may be operated to delay or slow data traffic in different lanes by different amounts until the alignment markers in the different lanes become aligned with one another. The PCS 110 may be configured to detect that application of an alignment marker is imminent. The PCS 110 may send a control signal to the MAC sublayer 108 or control circuitry 104 to indicate an imminent insertion of an alignment marker.

The serializer/deserializer (SERDES) 112 may be implemented within the physical layer of the first node 102. The SERDES 112 is a functional block that serializes and deserializes transmitted data or received data, respectively.

The temporal interval discussed above may be determined by the control circuitry 104 based on a timer in the PCS 110, which counts down the remaining time until the next occurrence of an alignment marker (or other delay-inducing phenomenon) and passes that value to the MAC sublayer 108. The delay-inducing phenomenon may be periodic in nature, wherein the occurrences of the phenomenon may be predictable.

The timer signal from the PCS 110, may act as an interrupt signal to prevent application of a timestamp to a timing protocol packet by the timestamp application component (e.g., the MAC sublayer 108). A threshold counter in the MAC sublayer 108 may be programmed with a threshold value signifying how close to the occurrence of the delay-inducing phenomenon a timestamp may be applied (the aforementioned temporal guard band). If a timestamp is to be applied, but the next occurrence of the delay-inducing phenomenon is within the threshold, the control circuitry 104 determines prevents, during the temporal interval, the application of a timestamp and transmission of the timing protocol packet 114.

While apparatus 100 depicts an implementation in which a first node 102, such as a network switch device, apparatus 100 may be implemented in other network interface devices, such as an Ethernet physical layer transceiver.

Figure 2:
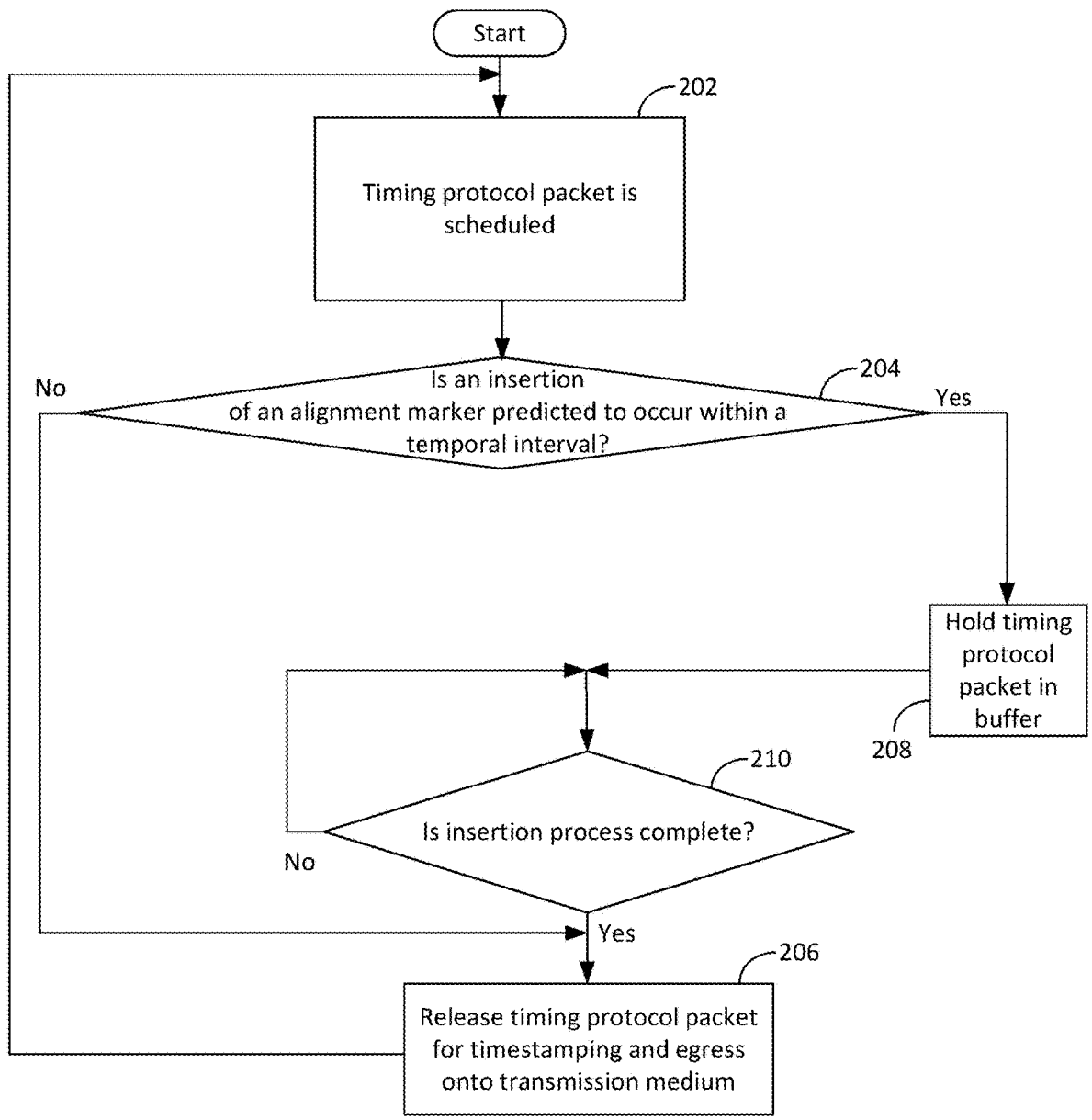
FIG. 2 shows a method for preventing the transmission of a timing protocol packet received by a node from being affected by an insertion of an alignment marker, according to some implementations of the subject matter of this disclosure.

As seen in FIG. 2, when, at 202, the process of timestamping and transmitting a timing protocol packet is scheduled, whether because timing protocol packets are issued on a regular schedule, or because another node has requested a timing protocol packet (e.g., in a PTP system), the control circuitry detects at 204 whether insertion of an alignment marker is going to occur within the temporal interval described above. If not, then as shown at 206, the control circuitry releases timing protocol packet for timestamping and egress onto the transmission medium. But if at 204 the control circuitry detects that insertion of an alignment marker is going to occur within the temporal interval, then at 208 control circuitry halts timing protocol packet traffic and stores received timing protocol packets in a buffer, in order to avoid the delay-inducing insertion of the alignment marker. The control circuitry then monitors at 210 for completion of the alignment marker insertion process. Once that process is complete, then at 206, the control circuitry releases timing protocol packet for timestamping and egress onto the transmission medium. Once the timing protocol packet has been released for timestamping and egress, the control system returns to 202 to await scheduling of the next timing protocol packet.

Figure 3:
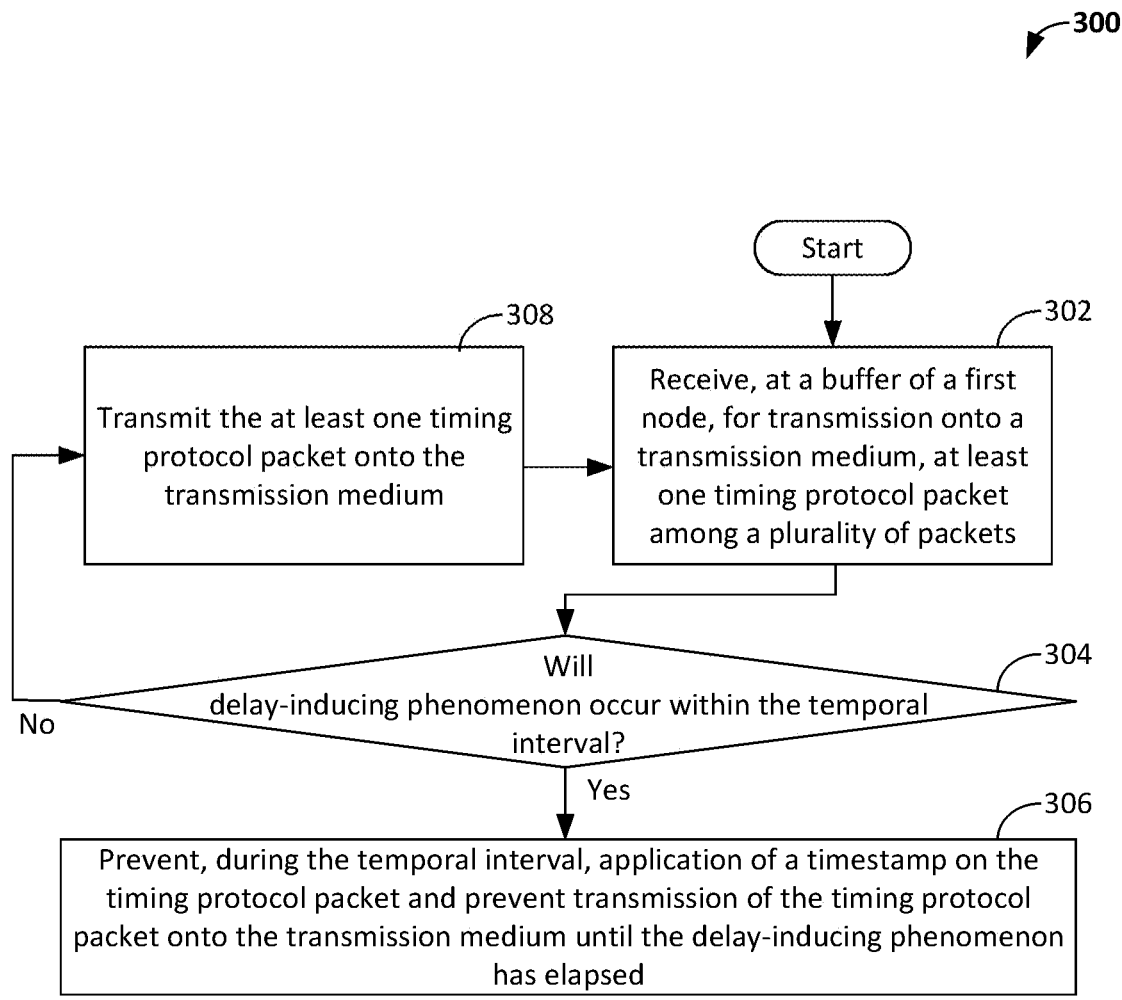
FIG. 3 shows a method for preventing the transmission of an at least one timing protocol packet received by a node, according to some implementations of the subject matter of this disclosure.

FIG. 3 is a flow diagram illustrating an implementation of a method 300 for preventing the transmission of an at least one timing protocol packet received by a node, according to some implementations of the subject matter of this disclosure. Method 300 begins at 302, where the first node 102 receives, for transmission onto the transmission medium 103, at least one timing protocol packet (e.g., timing protocol packet 114) of a plurality of packets. In some implementations, the first node 102 receives the timing protocol packet at the buffer 106 of the first node 102. At 304, the control circuitry 104 determines whether a delay-inducing phenomenon will occur within a temporal interval. The temporal interval is the period of time wherein a timing protocol packet would be affected by the inserted alignment marker. In some implementations, the delay-inducing phenomenon is the insertion of an alignment marker into the first node 102. In some implementations, the inserted alignment marker is used so that the receiver can determine how much to adjust the deskew buffer of each lane. The deskew buffers may be operated to delay or slow data traffic in different lanes by different amounts until the alignment markers in the different lanes become aligned with one another. When the control circuitry 104 determines that the delay-inducing phenomenon will occur within the temporal interval (e.g., an alignment marker inserted after a timing protocol packet is timestamped), the control circuitry 104 is configured to prevent the timestamping and transmission of the at least one timing protocol packet, at 306. When the control circuitry 104 does not detect that the delay-inducing phenomenon will occur within the temporal interval, control circuitry 104 transmits the at least one timing protocol packet onto the transmission medium 103, at 308, receives further timing protocol packets, at 302, and continues to monitor, at 304 for occurrence of delay-inducing phenomenon. At 306, the control circuitry 104 prevents application of a timestamp and transmission of the at least one timing protocol packet onto the transmission medium 103. The timing protocol packet may be stored in buffer 106 to prevent the application of a timestamp or premature transmission until the delay-inducing phenomenon has elapsed. By avoiding application of timestamps when the delay-inducing phenomenon is imminent, the possibility of delay of transmission after application of a timestamp to the timing protocol packet 114, resulting in a stale or outdated timestamp, is avoided. In some implementations, the control circuitry 104 stores the timing protocol packet in any suitable memory other than buffer 106 in order for the timing protocol packet 114 to avoid the delay-inducing phenomenon.

At 308, the at least one timing protocol packet is transmitted through each of the MAC sublayer 108, the PCS 110 and SERDES 112, prior to being sent onto the transmission medium 103. Timestamps are applied to the timing protocol packet at the MAC sublayer 108 as the timing protocol packet is transmitted to the transmission medium 103. When the at least one timing protocol packet is transmitted onto the transmission medium 103, the first node 102 is able to receive further timing protocol packets of the plurality of packets, at 302.

Figure 4:
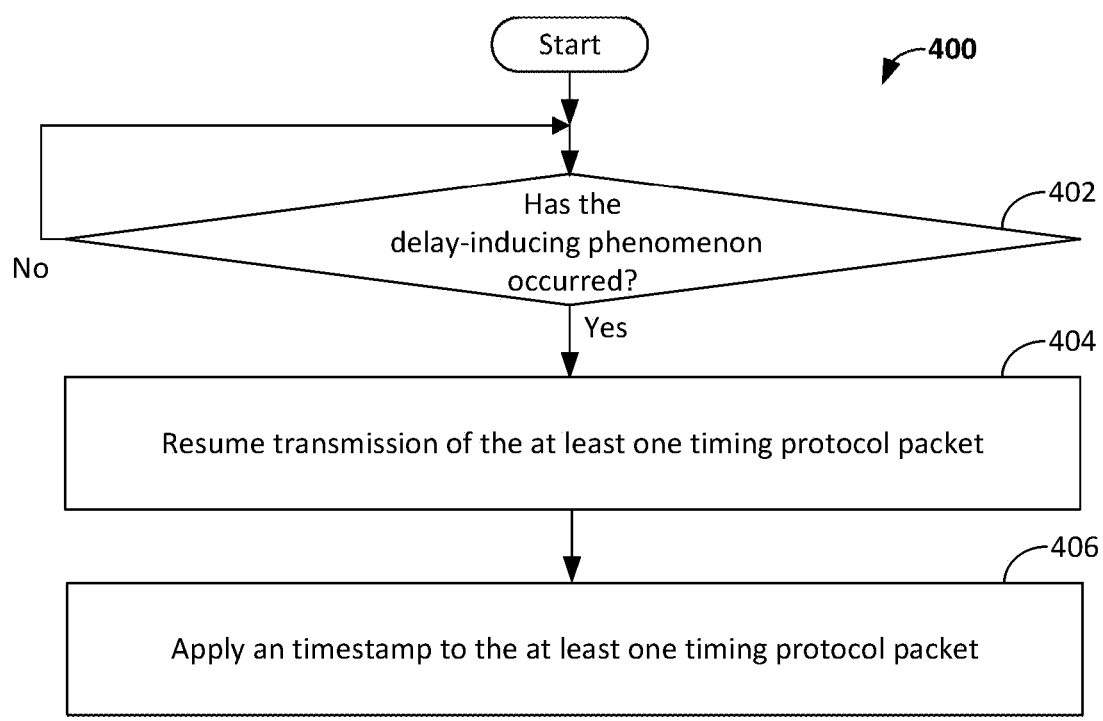
FIG. 4 shows a method for resuming the transmission of an at least one timing protocol packet stored into a buffer of a node, according to some implementations of the subject matter of this disclosure.

FIG. 4 is a flow diagram illustrating an implementation of a method 400 of resuming the transmission of an at least one timing protocol packet 114 stored into a buffer 106 of a first node 102, according to some implementations of the subject matter of this disclosure. Method 400 begins at 402, where the control circuitry 104 of a first node 102 determines whether the delay-inducing phenomenon has occurred. In some implementations, the delay-inducing phenomenon is inserting an alignment marker into a data stream after a timing protocol packet is timestamped and before the timing protocol packet is transmitted from the apparatus 100. In such implementations, the control circuitry 104 may receive a control signal which represents when the alignment marker has been sent. If the control circuitry 104 determines that the delay-inducing phenomenon has not yet occurred, in an implementation, the control circuitry 104, may continue to prevent the timestamping and transmission of the timing protocol packets until the control circuitry 104 determines that the delay-inducing phenomenon has occurred. When the control circuitry 104 determines that the delay-inducing phenomenon has occurred (e.g., before the timestamp is applied to a timing protocol packet), the control circuitry 104 may resume the transmission of the at least one timing protocol packet stored in buffer 106, at 404. At 404, the control circuitry 104 resumes transmission of the at least one timing protocol packet. The control circuitry 104 resumes the transmission of the at least one timing protocol packet once the detected delay-inducing phenomenon can no longer affect the latency of the at least one timing protocol packet. At 406, the control circuitry 104 accesses the stored timing protocol packet from buffer 106 in order for a timestamp application component of the first node 102 to apply a timestamp to each of the at least one timing protocol packet. In some implementations, the MAC sublayer 108 applies a timestamp to the at least one timing protocol packet, as the control circuitry 104 resumes the transmission of the at least one timing protocol packet.

Figure 5:
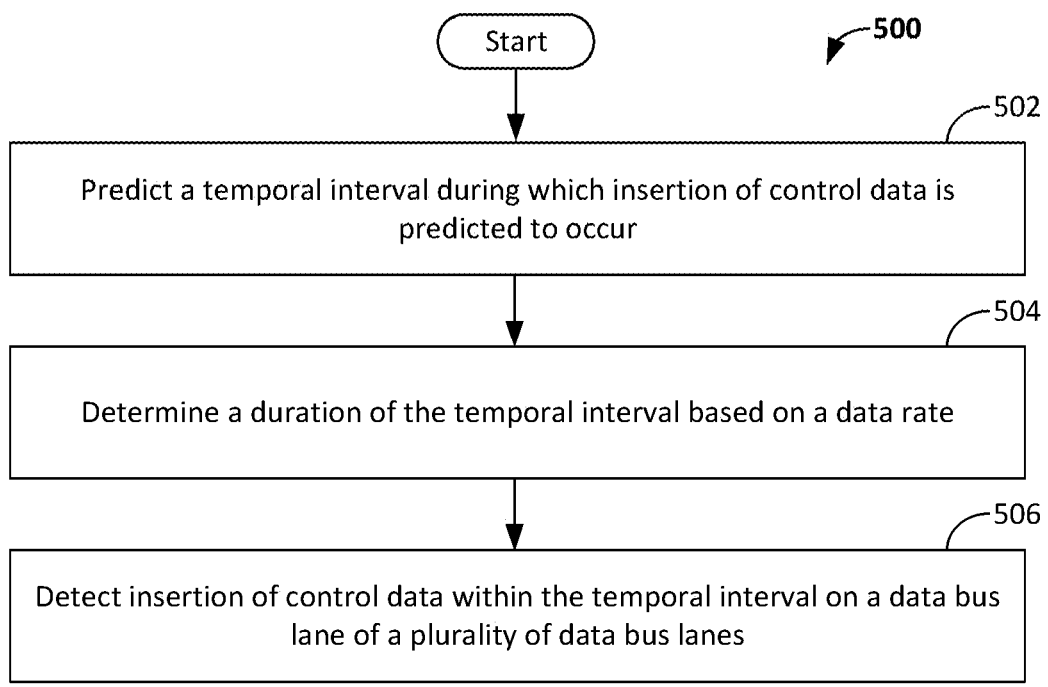
FIG. 5 shows a method for determining a temporal interval and detecting that an inserted alignment marker occurs within the temporal interval, according to some implementations of the subject matter of this disclosure.

A method 500, in accordance with implementations of the subject matter of this disclosure, is diagrammed in FIG. 5. Method 500 begins at 502, where the control circuitry 104 predicts the temporal interval during which insertion of control data (i.e., an alignment marker) is expected to occur. At 504, the control circuitry 104 determines a duration of the temporal interval based on a data rate. At 506, the control circuitry 104 detects an inserted alignment marker within the temporal interval on a data bus lane of a plurality of data bus lanes. In some implementations, during the temporal interval, the control circuitry 104 prevents the transmission of timing protocol packets. In some implementations, the control circuitry 104 stores the timing protocol packets into the buffer 106 in order to prevent the transmission of the timing protocol packets. In some implementations, the control circuitry 104 receives a control signal when the alignment marker has elapsed. When the control signal is received the control circuitry 104 may determine to resume the transmission of the timing protocol packets stored in the buffer 106 as there is no longer a possibility of the elapsed insertion of the alignment marker inducing further delays onto timing protocol packets.

Thus it is seen an apparatus and related methods for preventing and resuming timestamping and transmission of timing protocol packets during the occurrence of delay-inducing phenomena, which may cause timestamps of the timing protocol packets to become inaccurate, have been provided.

As used herein and in the claims, which follow, the construction "one of A and B" shall mean "A or B."

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. A method for increasing accuracy of a timestamp applied to a timing protocol packet, the method comprising:
receiving, at a buffer of a first node, for transmission onto a transmission medium, at least one timing protocol packet among a plurality of packets of a data stream;
detecting, by control circuitry of an apparatus, that control data for skew adjustment affecting a timestamp to be applied to a timing protocol packet will be inserted into the data stream within a temporal interval by monitoring for insertion of the control data into the data stream; and
in response to detecting that the control data for skew adjustment will be inserted into the data stream within the temporal interval,
preventing, by the control circuitry, during the temporal interval, application of the timestamp to the timing protocol packet and preventing transmission of the timing protocol packet onto the transmission medium until after insertion, into the data stream, of the control data for skew adjustment has occurred.

2. The method for increasing accuracy of a timestamp applied to a timing protocol packet according to claim 1, wherein:
the control data for skew adjustment is periodic; and
detecting that the control data for skew adjustment affecting a timestamp to be applied to a timing protocol packet will be inserted into the data stream within the temporal interval comprises detecting that a period of the periodic control data for skew adjustment will elapse during a duration of the temporal interval.

3. The method for increasing accuracy of a timestamp applied to a timing protocol packet according to claim 1, wherein receiving the at least one timing protocol packet of the plurality of packets of the data stream comprises:
receiving at least one precision time protocol (PTP) packet among a plurality of PTP packets.

4. The method for increasing accuracy of a timestamp applied to a timing protocol packet according to claim 1, the method further comprising storing in a memory the at least one timing protocol packet of which transmission was prevented until after insertion, into the data stream, of the control data for skew adjustment has occurred.

5. The method for increasing accuracy of a timestamp applied to a timing protocol packet according to claim 4, the method further comprising:
determining that insertion of the control data for skew adjustment into the data stream has occurred; and
in response to determining that insertion of the control data for skew adjustment into the data stream has occurred,
applying a timestamp to the at least one timing protocol packet, and
resuming transmission of the at least one timing protocol packet onto the transmission medium.

6. The method for increasing accuracy of a timestamp applied to a timing protocol packet according to claim 5 wherein the resuming comprises transmitting the at least one timing protocol packet that was stored in memory to avoid the control data for skew adjustment.

7. The method for increasing accuracy of a timestamp applied to a timing protocol packet according to claim 1, the method further comprising:
determining the temporal interval based on when the insertion of the control data affecting a timestamp to be applied to a timing protocol packet is predicted to occur; and
determining a duration of the temporal interval based on a data rate.

8. The method for increasing accuracy of a timestamp applied to a timing protocol packet according to claim 7, wherein detecting that insertion of the control data for skew adjustment into the data stream occurs within a temporal interval comprises:
detecting the insertion of the control data within a temporal interval on a data bus lane of a plurality of data bus lanes, wherein each data bus lane is configured to transport a portion of the at least one timing protocol packet from among the plurality of packets.

9. The method for increasing accuracy of a timestamp applied to a timing protocol packet according to claim 8, wherein detecting that insertion of the control data for skew adjustment into the data stream occurs within a temporal interval comprises:
predicting when insertion of an alignment marker into the data stream occurs, wherein the alignment marker is configured to align a data bus lane of the plurality of data bus lanes relative to other data bus lanes of the plurality of data bus lanes.

10. Apparatus for sending timing protocol packets from a first node onto a transmission medium, the apparatus comprising:
a buffer in the first node, the first node being configured to receive, at the buffer, for transmission onto the transmission medium, at least one timing protocol packet among a plurality of packets of a data stream;
memory; and
control circuitry configured to:
detect that control data for skew adjustment affecting a timestamp to be applied to timing protocol packet will be inserted into the data stream within a temporal interval by monitoring for insertion of the control data into the data stream; and
in response to detecting that the control data for skew adjustment will be inserted into the data stream within the temporal interval,
prevent, during the temporal interval, application of the timestamp to the timing protocol packet and preventing transmission of the timing protocol packet onto the transmission medium until after insertion, into the data stream, of the control data for skew adjustment has occurred.

11. The apparatus of claim 10, wherein the control circuitry is configured to detect that the phenomenon control data for skew adjustment will be inserted into the data stream within a temporal interval by detecting that a period of a periodic control data for skew adjustment will elapse within the temporal interval.

12. The apparatus of claim 10, wherein the first node is configured to receive, at the buffer, at least one Precision Time Protocol (PTP) packet among a plurality of PTP packets.

13. The apparatus of claim 10, wherein the control circuitry is further configured to store, in the memory, the at least one timing protocol packet of which transmission was prevented until after insertion, into the data stream, of the control data for skew adjustment has occurred.

14. The apparatus of claim 13, wherein the memory in which the at least one timing protocol packet is to be stored is the buffer.

15. The apparatus of claim 14, wherein the control circuitry is further configured to:
determine that insertion of the control data for skew adjustment into the data stream has occurred; and
in response to determining that insertion of the control data for skew adjustment into the data stream has occurred,
apply a timestamp to the at least one timing protocol packet, and
resume transmission of the at least one timing protocol packet onto the transmission medium.

16. The apparatus of claim 15 wherein the control circuitry is configured to resume transmission by transmitting the at least one timing protocol packet that was stored in the buffer to avoid the control data for skew adjustment.

17. The apparatus of claim 10, wherein the control circuitry is further configured to:
determine the temporal interval based on when the insertion of the control data affecting a timestamp to be applied to timing protocol packet is predicted to occur; and determine a duration of the temporal interval based on a data rate.

18. The apparatus of claim 17, further comprising:
a plurality of data bus lanes, each data bus lane configured to transport a portion of the at least one timing protocol packet from among the plurality of packets.

19. The apparatus of claim 18, wherein the control circuitry is configured to monitor for the insertion of the control data into the data stream by predicting when insertion of an alignment marker into the data stream occurs, wherein the alignment marker is configured to align a data bus lane of the plurality of data bus lanes relative to other data bus lanes of the plurality of data bus lanes.

\* \* \* \* \*